(12) United States Patent
Pereira (10) Patent No.: US 11,203,899 B2
(45) Date of Patent: Dec. 21, 2021

(54) SOLAR-POWERED INTELLIGENT AUTOMATED MOTORIZED WINDOW TREATMENT WITH INCREASED ENERGY EFFICIENCY AND METHOD OF USING SAME

(71) Applicant: ROLL-A-SHADE INC., Mississauga (CA)

(72) Inventor: Tyrone John Anthony Pereira, Mississauga (CA)

(73) Assignee: ROLL-A-SHADE INC., Mississauga (CA)

( * ) Notice: Subject to any disclaimer, the term of this patent is extended or adjusted under 35 U.S.C. 154(b) by 0 days.

(21) Appl. No.: 15/918,066

(22) Filed: Mar. 12, 2018

(65) Prior Publication Data
US 2019/0277086 A1   Sep. 12, 2019

(51) Int. Cl.
*E06B 9/68* (2006.01)
*H02S 40/38* (2014.01)
(Continued)

(52) U.S. Cl.
CPC ................ *E06B 9/68* (2013.01); *H02J 7/025* (2013.01); *H02J 7/35* (2013.01); *H02S 40/38* (2014.12);
(Continued)

(58) Field of Classification Search
CPC ...... E06B 9/68; E06B 9/72; E06B 2009/6809; H02S 40/38; H02S 99/00; H02J 7/025; H02J 7/35; H02J 7/00
See application file for complete search history.

(56) References Cited

U.S. PATENT DOCUMENTS 5,413,161 A   5/1995  Corazzini
5,532,560 A   7/1996  Element et al.
(Continued)

*Primary Examiner* — Colleen M Chavchavadze
*Assistant Examiner* — Jeremy C Ramsey
(74) *Attorney, Agent, or Firm* — Bereskin & Parr LLP/S.E.N.C.R.L., s.r.l.

(57) ABSTRACT

The present invention relates in general to a self-contained, solar-powered, self-regulating intelligent automated window treatment with increased energy efficiency. In particular, in accordance with one embodiment, the invention relates to a self-contained, solar-powered, self-regulating intelligent automated window treatment with increased energy efficiency consisting of: (1) a headrail with at least one solar panel, a rechargeable battery that is charged by the solar panel, and a motor that is powered by the rechargeable battery; (2) window shade fabric with one terminus of the fabric affixed to a tube and with the fabric wrapped around the tube and located within the headrail; (3) a smart bottom rail attached to the terminus of the shade fabric furthest from the tube with the bottom rail containing, at least one environmental sensor, at least one control button, at least one solar panel, and a rechargeable battery that is charged by the solar panel and that provides power to the environmental sensors and control buttons. The environmental sensors will provide information that will be used to determine when the shade motor should automatically raise and lower the shade with minimal effort from the user. In addition to relying on solar power, the automatic adjustment of the window treatment will allow for a reduction of energy consumption by the user by decreasing the need for artificial lighting, heating, and air conditioning.

In another embodiment of the invention, solar power stored in the rechargeable battery of the bottom rail may be transferred to the rechargeable battery-powered motor of the headrail.

34 Claims, 12 Drawing Sheets

(51) Int. Cl.
  *H02S 99/00* (2014.01)
  *H02J 7/02* (2016.01)
  *H02J 7/35* (2006.01)
  *H04W 4/80* (2018.01)
  *H02J 7/00* (2006.01)

(52) U.S. Cl.
  CPC ...... *H02S 99/00* (2013.01); *E06B 2009/6827* (2013.01); *H02J 7/00* (2013.01); *H04W 4/80* (2018.02)

(56) References Cited

U.S. PATENT DOCUMENTS

| | | |
|---|---|---|
| 7,389,806 B2 * | 6/2008 | Kates .................. E06B 9/32 160/5 |
| 8,299,734 B2 | 10/2012 | Mullet et al. |
| 8,525,462 B2 | 9/2013 | Berman et al. |
| 8,659,246 B2 | 2/2014 | Mullet et al. |
| 8,851,141 B2 | 10/2014 | Blair et al. |
| 8,950,461 B2 | 2/2015 | Adams et al. |
| 9,045,939 B2 | 6/2015 | Blair et al. |
| 2014/0027069 A1 | 1/2014 | Oppizzi |
| 2017/0051557 A1 * | 2/2017 | Hall .................. E06B 9/72 |
| 2018/0202224 A1 * | 7/2018 | Kumar .................. E06B 9/42 |
| 2019/0048656 A1 * | 2/2019 | Combee .................. E06B 9/38 |
| 2019/0119978 A1 * | 4/2019 | Hall .................. G05B 15/02 |

* cited by examiner

SOLAR-POWERED INTELLIGENT AUTOMATED MOTORIZED WINDOW TREATMENT WITH INCREASED ENERGY EFFICIENCY AND METHOD OF USING SAME

RELATED APPLICATION

This application is a non-provisional application of U.S. Provisional Application No. 62/601,153, filed Mar. 14, 2017 entitled AUTOMATED MOTORIZED WINDOW TREATMENT WITH INCREASED ENERGY EFFICIENCY AND METHOD OF MAKING SAME, the entire disclosure of which is hereby incorporated by reference.

FIELD OF THE INVENTION

The present invention relates in general to a self-contained, solar-powered, self-regulating intelligent automated window treatment with increased energy efficiency.

BACKGROUND OF INVENTION

There is no admission that the background art disclosed in this section legally constitutes prior art.

There have been many different types and kinds of motorized window treatments. For example, reference may be made to U.S. Pat. Nos. 5,413,161; 5,532,560; 8,299,734 B2; 8,525,462 B2; 8,659,246 B2; 8,851,141 B2; 8,950,461 B2; and 9,045,939 B2.

The use of integrated technological systems in buildings (both home and commercial) is one of the most significant new trends in digital innovation. Transitioning to a smarter building can improve the building occupant's control over every aspect of how the building operates, and increase the safety, energy efficiency, and accessibility of it as well. Smart building systems and devices often operate together, sharing consumer usage data among themselves and automating actions based on the building occupants' preferences.

The U.S. Department of Energy has stated that "When properly installed, window shades can be one of the simplest and most effective window treatments for saving energy" and advises that "You should lower shades on sunlit windows in the summer. Shades on the south side of a house should be raised in the winter during the day, then lowered during the night." https://www.energy.gov/energysaver/energy-efficient-window-treatments.

Energy efficiency can only be achieved if the window shades are raised or lowered to the optimal positions as environmental conditions change. This is a challenge with manual treatments and non-automated motorized treatments, it is unlikely to be done when the building occupant is absent, and it is an inconvenience to the building occupant to constantly adjust the window treatments when present. Thus these adjustments are often not done when needed. Furthermore, the majority of commercially available automated motorized window treatments are ideal for large office buildings, where environmental sensors can be mounted on the roof of the building. Although this allows for accurate environmental readings, this placement of sensors is less than ideal for many small commercial and residential buildings.

Thus there currently is a need for an automated motorized window treatment with increased energy efficiency that (1) allows for maximum light harvesting for the health of the building occupants; (2) allows for heat control by incremental movement of the shade with respect to sun position; (3) requires minimal effort from the building occupant; (4) is easy to install; and (5) is designed for use in small commercial and residential buildings.

SUMMARY OF THE INVENTION

The present invention relates in general to a self-contained, solar-powered, self-regulating intelligent automated window treatment with increased energy efficiency. In particular, in accordance with one embodiment, the invention relates to a self-contained, solar-powered, self-regulating intelligent automated window treatment with increased energy efficiency consisting of: (1) a headrail with at least one solar panel, a rechargeable battery that is charged by the solar panel, and a motor that is powered by the rechargeable battery; (2) window shade fabric with one terminus of the fabric affixed to a tube and with the fabric wrapped around the tube and located within the headrail; (3) a smart bottom rail attached to the terminus of the shade fabric furthest from the tube with the bottom rail containing, at least one environmental sensor, at least one control button, at least one solar panel, and a rechargeable battery that is charged by the solar panel and that provides power to the environmental sensors and control buttons. The environmental sensors will provide information that will be used to determine when the shade motor should automatically raise and lower the shade with minimal effort from the user. In addition to relying on solar power, the automatic adjustment of the window treatment will allow for a reduction of energy consumption by the user by decreasing the need for artificial lighting, heating, and air conditioning.

In another embodiment of the invention, solar power stored in the rechargeable battery of the bottom rail may be transferred to the rechargeable battery-powered motor of the headrail.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings.

DETAILED DESCRIPTION OF THE INVENTION

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

Embodiments of the present invention provide a self-contained, solar-powered, self-regulating intelligent automated motorized window treatment with increased energy efficiency, wherein the window treatment is suitable for use in a small commercial or residential building.

In one embodiment of the invention a self-contained, solar-powered, self-regulating intelligent automated motorized window treatment with increased energy efficiency is a window shade consisting of: (1) shade fabric wrapped around a tube; (2) a headrail; (3) a bottom rail; (4) a motor located in the headrail; (5) a rechargeable battery in the headrail to power the motor; (6) a solar panel on the window-facing side of the headrail to provide power for the motor's rechargeable battery in the headrail; (7) at least one control button located on the bottom rail that may be used to raise or lower the shade or to set a favourite position; (8) at least one environmental sensor located on the bottom rail that may be a light sensor, a temperature sensor, a UV light sensor, or a humidity sensor; (9) a rechargeable battery in the bottom rail to power the control buttons and environmental sensors; (10) a solar panel on the window-facing side of the bottom rail to provide power for the rechargeable battery in the bottom rail. Additional environmental sensors may be located on the headrail.

In another embodiment of the invention, a self-contained, solar-powered, self-regulating intelligent automated motorized window treatment with increased energy efficiency is a window shade consisting of shade fabric wrapped around a tube, with a headrail and a bottom rail, a rechargeable battery-powered motor located within the headrail, at least one solar panel, a solar powered rechargeable battery, at least one environmental sensor, at least one wireless charging transmitter, and at least one wireless charging receiver. The at least one solar cell is located on the window facing side of the bottom rail. Additional solar cells may be located on the window facing side of the headrail or on the room facing side of the bottom rail or headrail. The at least one solar cell will be connected to at least one solar powered rechargeable battery. The at least one environmental sensor is located on the window facing side of the bottom rail. Additional environmental sensors may be located on the window facing side of the headrail or on the room facing side of the bottom rail or headrail. The at least one wireless charging transmitter is located in the bottom rail and is connected to the solar powered rechargeable battery, and the at least one wireless charging receiver is located in the headrail and is connected to the rechargeable battery of the motor.

In a further embodiment of the invention, a self-contained, solar-powered, self-regulating intelligent automated motorized window treatment with increased energy efficiency described above further has a charging port, such as a universal serial bus (USB) charging port on the bottom rail and/or the headrail, and control buttons on the bottom rail and/or the headrail.

In further embodiments of the above described embodiments of the invention, the motor will include a wireless communication protocol means, such as Bluetooth, which will allow it to communicate directly with a software application (an app) on a mobile or desktop device without the need of communicating through additional hardware, such as a hub. The environmental sensors may include, but are not limited to, a light sensor, a temperature sensor, an ultraviolet (UV) light sensor, and a humidity sensor. The control buttons on the shade may include, but are not limited to, buttons for raising and lowering the shade and a button for the occupant's favorite amount of openness of the shade. These buttons, when located on the bottom rail, may communicate with the headrail motor through a communication method, such as RF wireless (Bluetooth Radio technology or piezoelectric RF technology), printed ink conductive lines in the shade fabric, or conductive thread woven in the shade fabric.

In another embodiment of the invention the rechargeable battery in the headrail may be charged by a wireless power transfer method, such as inductive coupling and/or resonant charging (e.g., Qi or AirFuel), or radio frequency (RF) (e.g., AirFuel RF or WattUp) with power obtained from the solar cells and the charging port. Other methods of power transfer may include ambient RF charging; printed ink conductive lines in the fabric of the shade; and conductive thread woven in the fabric of the shade.

Further aspects of the invention will become apparent from consideration of the drawings and the ensuing description of preferred embodiments of the invention. A person skilled in the art will realize that the other embodiments of the invention are possible and that the details of the invention can be modified in a number of respects, all without departing from the inventive concept. Thus, the following drawings and description are to be regarded as illustrative in nature and not restrictive.

One embodiment of the present invention is illustrated by way of example in FIGS. 1-4, which includes a self-contained, solar-powered, self-regulating intelligent automated motorized window treatment with increased energy efficiency 10. The window treatment 10 may be of any suitable size and shape for its application, and consists of (1) a headrail 12; (2) window shade fabric 14 with one terminus of the fabric affixed to a tube 16 and with the fabric 14 wrapped around the tube 16 and located within the headrail 12; (3) a bottom rail 18 attached to the terminus of the shade fabric 14 furthest from the tube 16; (4) at least one environmental sensor 20; (5) at least two solar panels 22 with at least one in the bottom rail 18 and at least one in the headrail 12; (6) a rechargeable battery 24 located in the bottom rail 18; and (7) a motor 26 powered by a rechargeable battery 28 located in the headrail 12. Additional solar panels 22 may be included on the bottom rail 18 and on the headrail 12.

The window treatment 10 may also contain a universal serial bus (USB) charging port 30 in the bottom rail 18 for an alternate means of charging the rechargeable battery 24. An additional USB port may be located in the headrail 12 (not shown).

Figure 1:
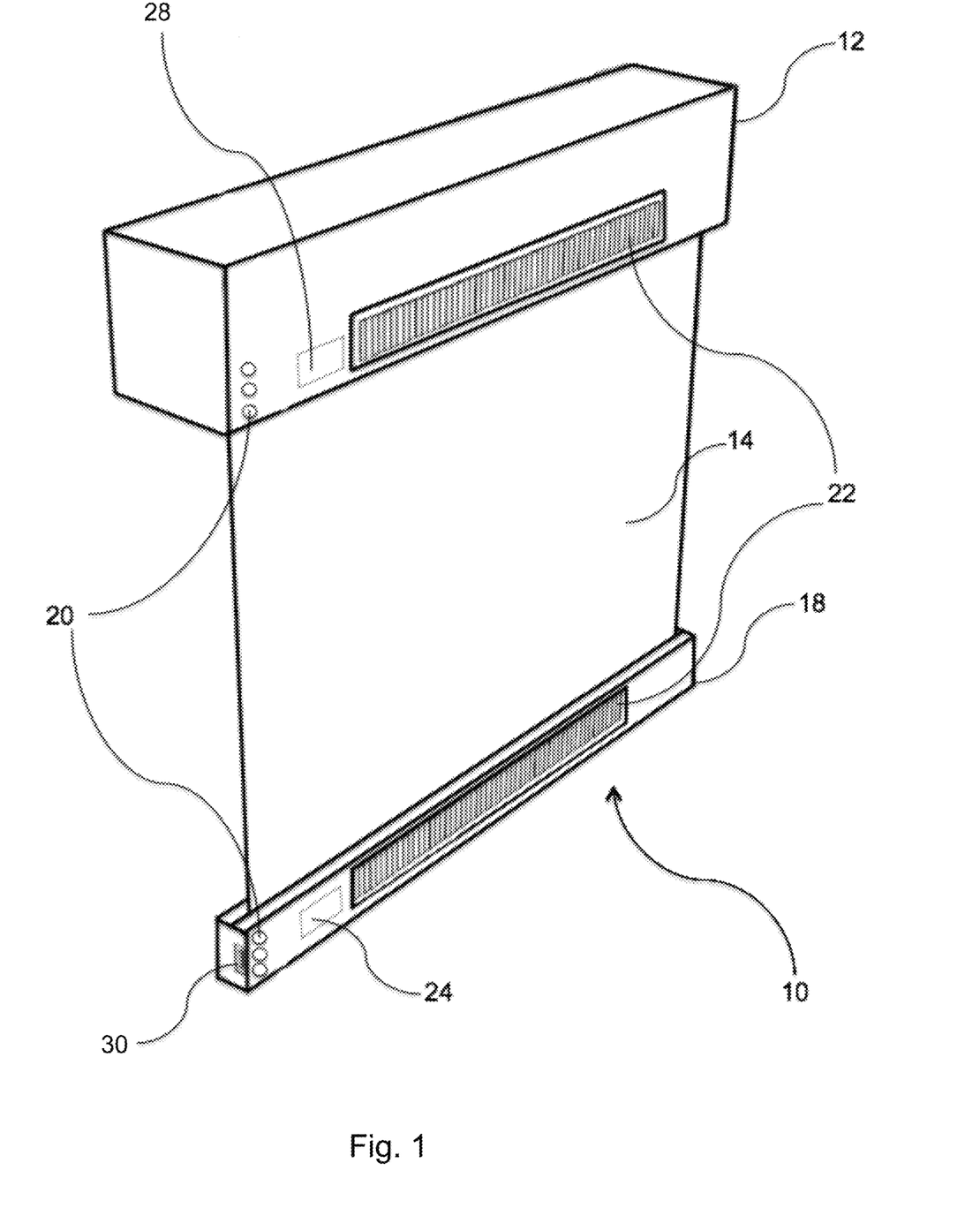
FIG. 1 is a perspective view of one embodiment of a self-contained, solar-powered, self-regulating intelligent automated window treatment viewed from the window facing side of the window treatment with the shade fully lowered.
Figure 2:
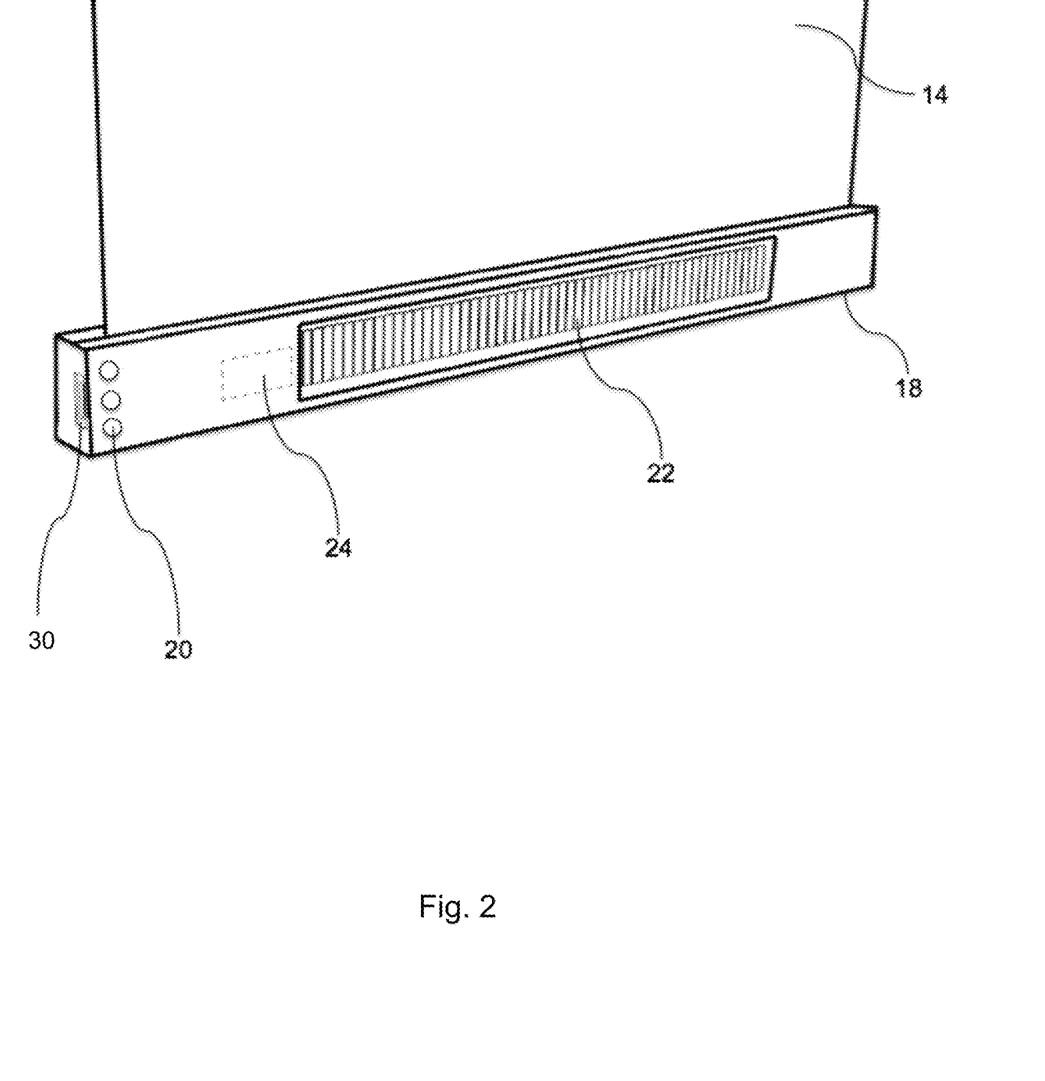
FIG. 2 is a perspective view of the bottom rail of the self-contained, solar-powered, self-regulating intelligent automated window treatment of FIG. 1 viewed from the window facing side of the window treatment.
Figure 3:
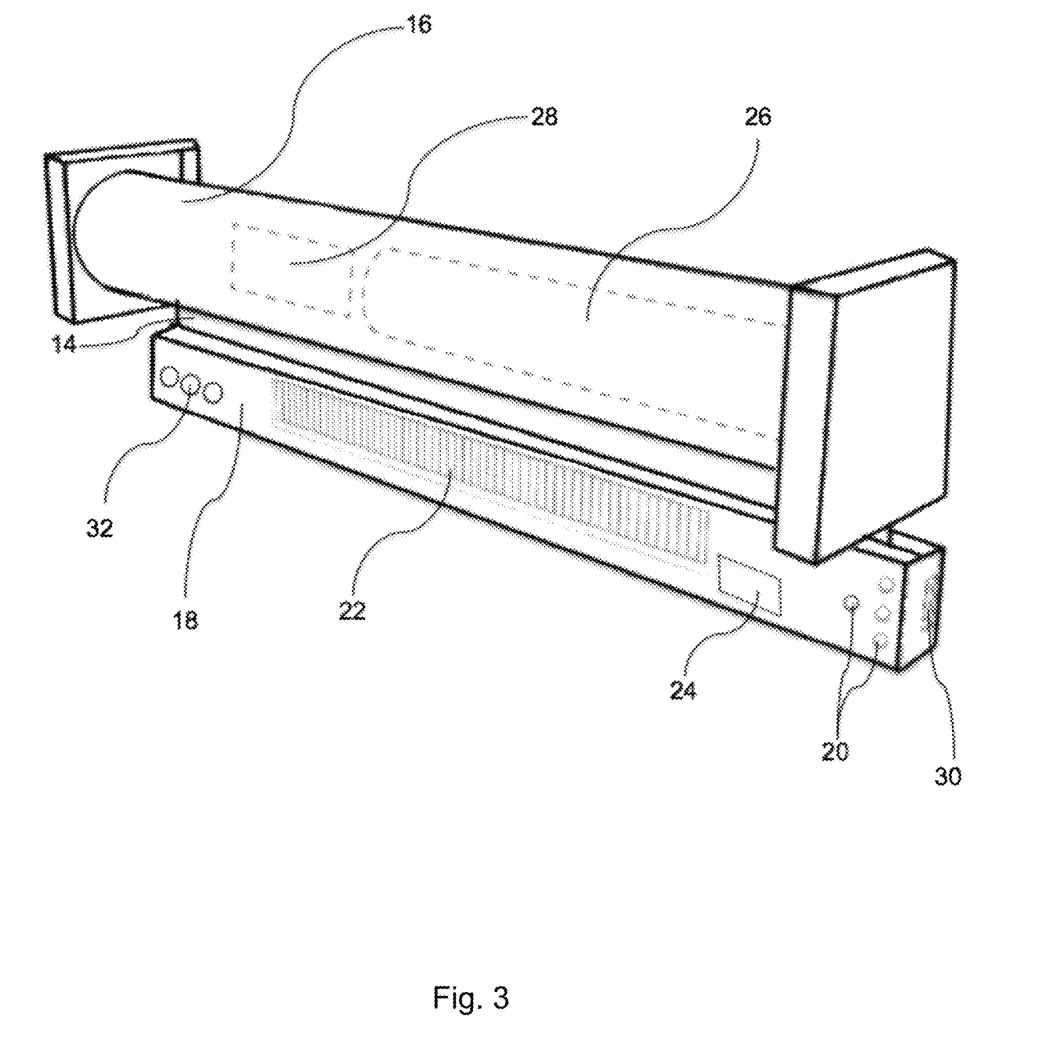
FIG. 3 is a perspective view of the self-contained, solar-powered, self-regulating intelligent automated window treatment of FIG. 1 viewed from the non-window side of the window treatment with the shade fully raised and with the headrail removed to show the parts contained within the headrail.
Figure 4:
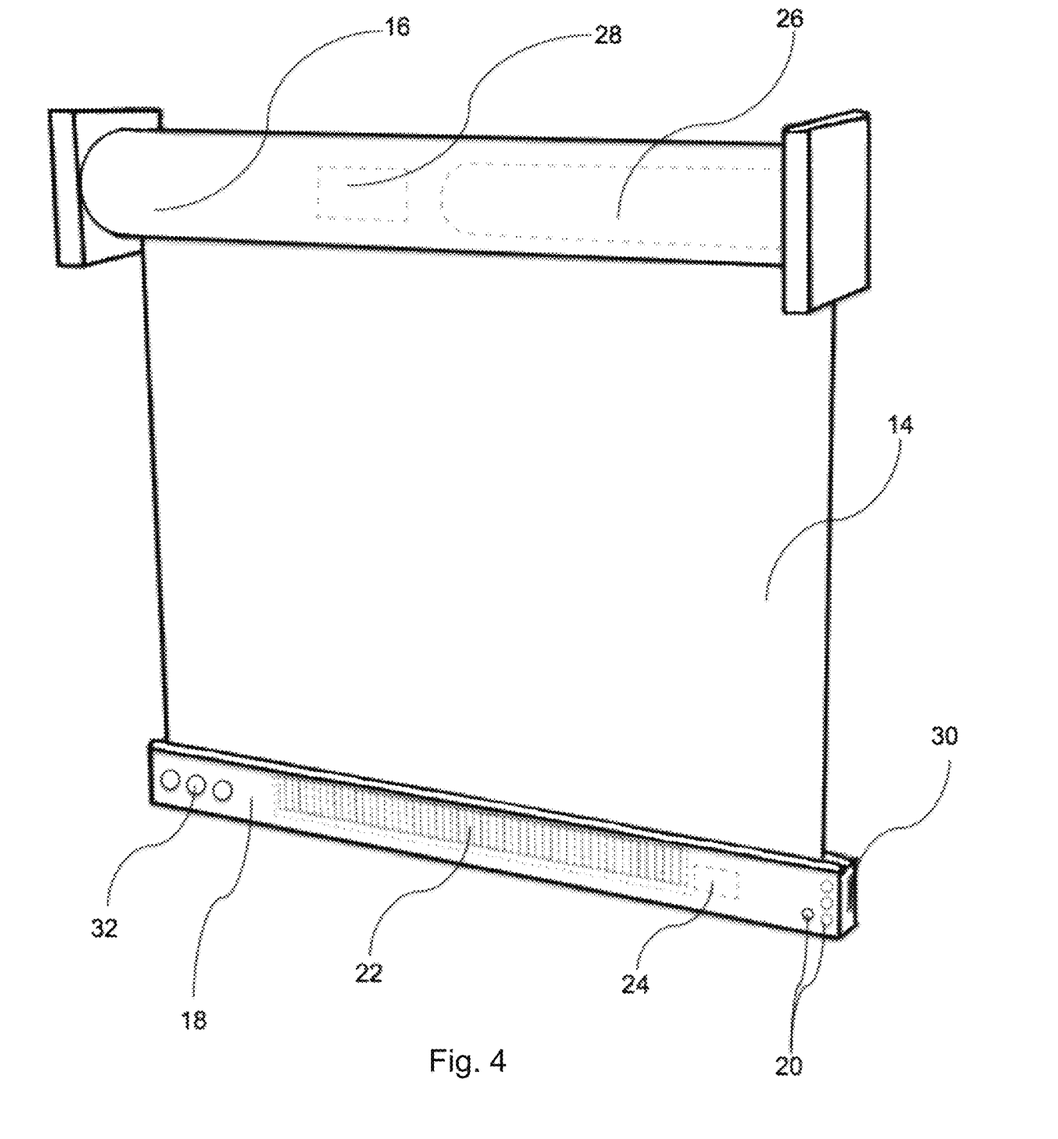
FIG. 4 is a perspective view of the self-contained, solar-powered, self-regulating intelligent automated window treatment of FIG. 1 viewed from the non-window side of the window treatment with the shade fully lowered and with the headrail removed to show the parts contained within the headrail.
Figure 5:
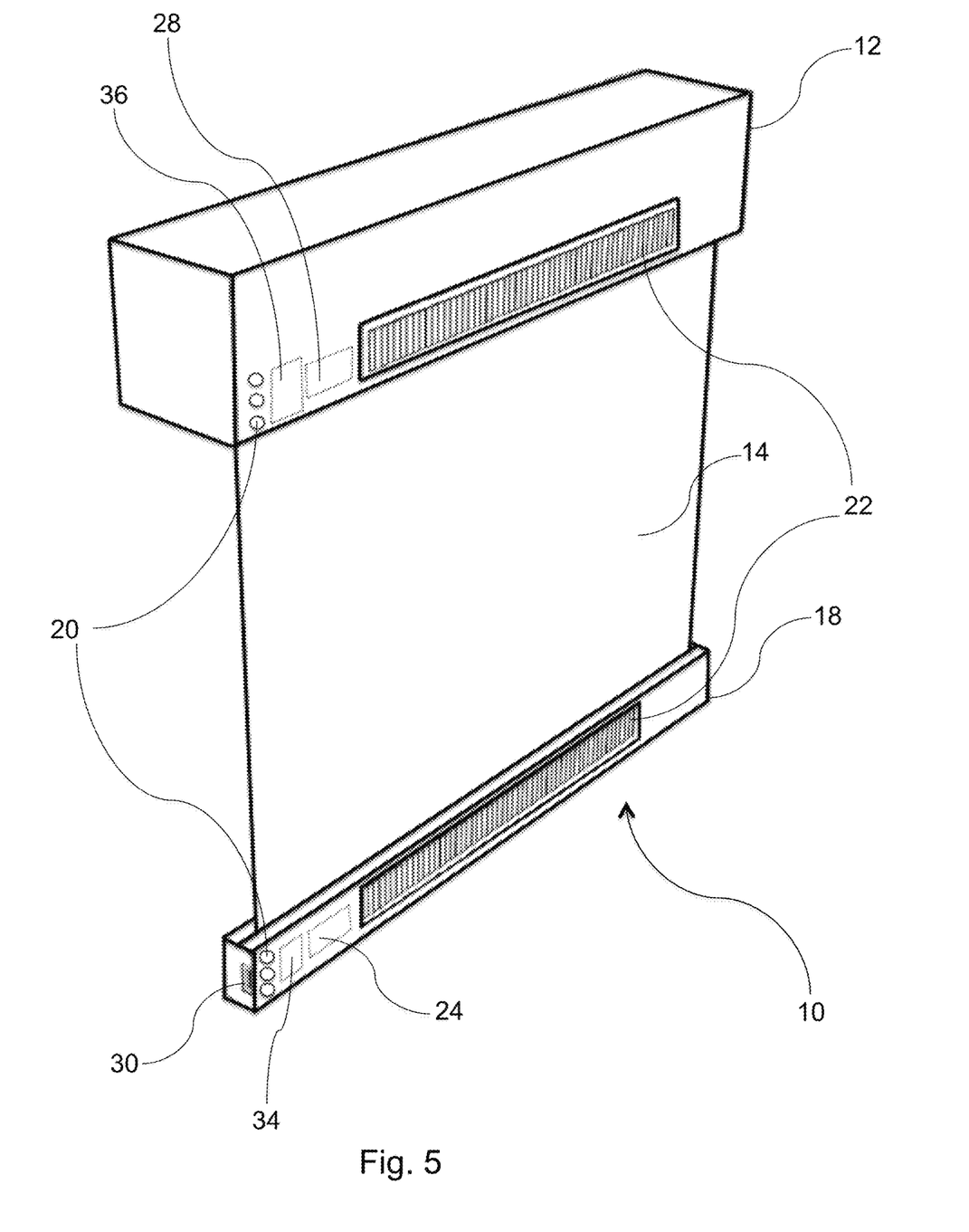
FIG. 5 is a perspective view of one embodiment of a self-contained, solar-powered, self-regulating intelligent automated window treatment viewed from the window facing side of the window treatment with the shade fully lowered. The window treatment contains a wireless charging transmitter in the bottom rail and a wireless charging receiver in the headrail.
Figure 6:
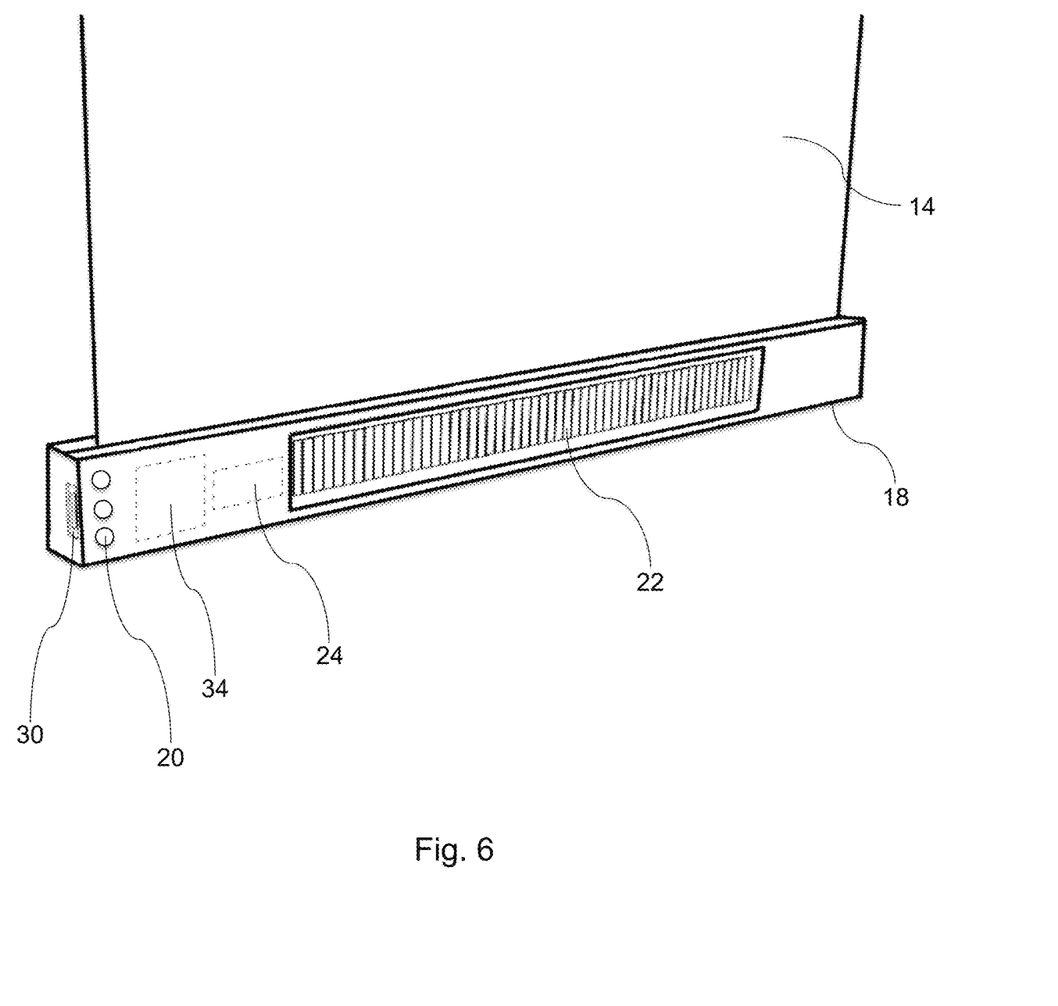
FIG. 6 is a perspective view of the bottom rail of the self-contained, solar-powered, self-regulating intelligent automated window treatment of FIG. 5 viewed from the window facing side of the window treatment.

As shown in FIGS. 3 and 4, the bottom rail 18 may also contain one or more control buttons 32 that may be used to raise or lower the shade or to set a favourite position. FIG. 3 shows the window treatment 10 in the fully raised position. FIG. 4 shows the window treatment 10 in the fully lowered position.

The solar panel 22 on the window-facing side of the bottom rail 18 provides power for the rechargeable battery 24 in the bottom rail, which is used to power the environmental sensors 20 and the control buttons 32.

Another embodiment of the present invention is illustrated by way of example in FIGS. 5-8, which includes a self-contained, solar-powered, self-regulating intelligent automated motorized window treatment with increased energy efficiency 10. The window treatment 10 may be of any suitable size and shape for its application, and consists of (1) a headrail 12; (2) window shade fabric 14 with one terminus of the fabric affixed to a tube 16 and with the fabric 14 wrapped around the tube 16 and located within the headrail 12; (3) a bottom rail 18 attached to the terminus of the shade fabric 14 furthest from the tube; (4) at least one environmental sensor 20; (5) at least one solar panel 22 in the bottom rail 18; (6) a rechargeable battery 24 located in the bottom rail 18; (7) a wireless charging transmitter 34 located in the bottom rail 18; (8) a wireless charging receiver 36 located in the headrail 12; and (9) a motor 26 powered by a rechargeable battery 28 located in the headrail 12. Solar power stored in the rechargeable battery 24 of the bottom rail 18 is transferred by way of the wireless charging transmitter 34 and wireless charging receiver 36 to the rechargeable battery 28 that powers the motor 26 within the headrail 12. Additional solar panels 22 may be included on the bottom rail 18 and on the headrail 12.

The window treatment 10 may also contain a universal serial bus (USB) charging port 30 for an alternate means of charging the rechargeable battery 24. The USB port 30 may be located in the bottom rail 18 (as shown) or the headrail 12 (not shown).

In this embodiment of the window treatment 10 invention, power derived from the solar cell 22 or the USB charging port 30 of the bottom rail 18 is stored in the rechargeable battery 24 of the bottom rail 18 until it is wirelessly transferred from the wireless charging transmitter 34 to the wireless charging receiver 36 by way of a wireless power transfer method, such as inductive coupling, resonant charging or RF, where it is able to charge the rechargeable battery 28 of the headrail 12 to power the motor 26.

Figure 7:
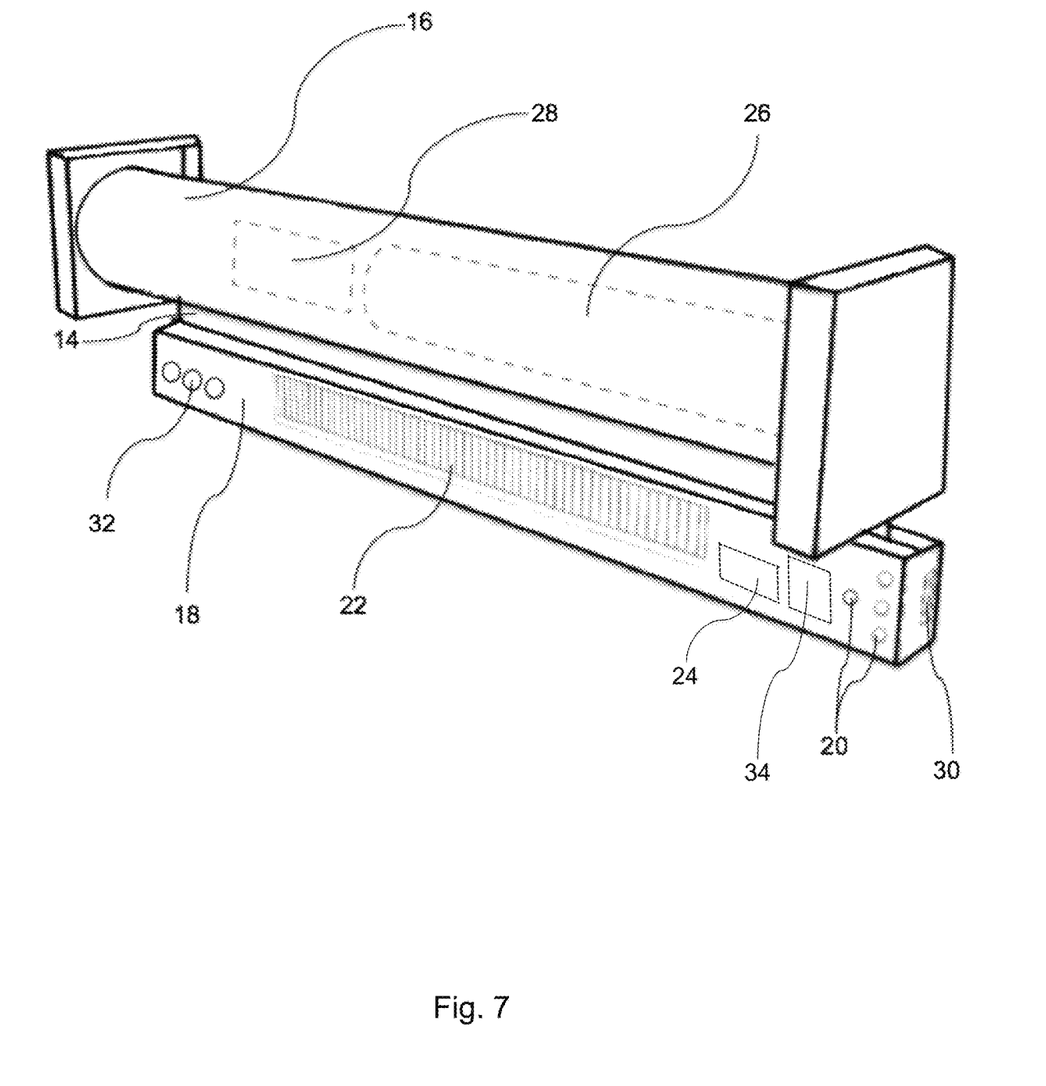
FIG. 7 is a perspective view of the self-contained, solar-powered, self-regulating intelligent automated window treatment viewed from the non-window side of the window treatment of FIG. 5 with the shade fully raised and with the headrail removed to show the parts contained within the headrail.
Figure 8:
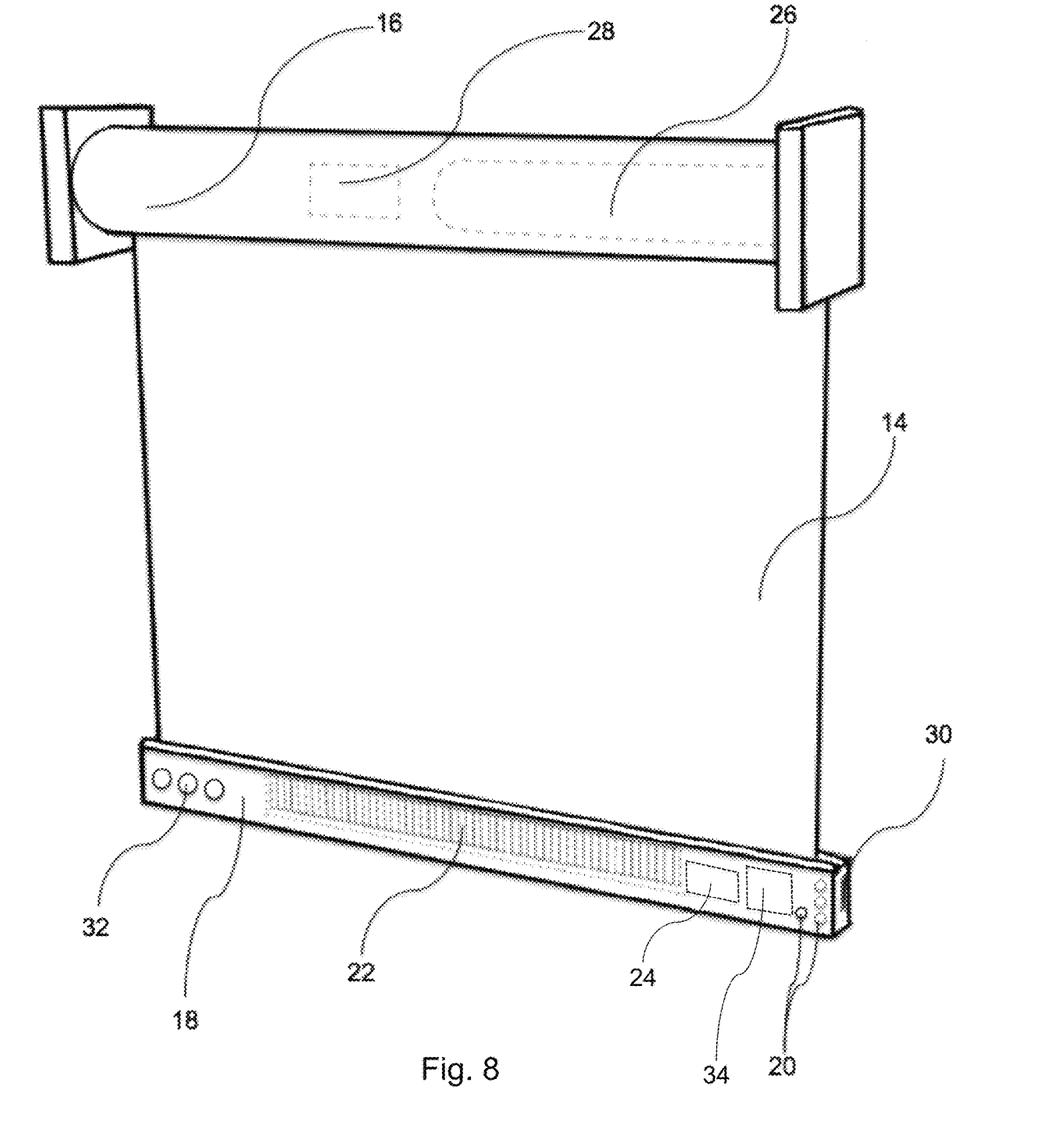
FIG. 8 is a perspective view of the self-contained, solar-powered, self-regulating intelligent automated window treatment of FIG. 5 viewed from the non-window side of the window treatment with the shade fully lowered and with the headrail removed to show the parts contained within the headrail.

As shown in FIGS. 7 and 8, the bottom rail 18 may also contain one or more control buttons 32 that may be used to raise or lower the shade or to set a favourite position. FIG. 7 shows the window treatment 10 in the fully raised position. FIG. 8 shows the window treatment 10 in the fully lowered position.

The solar panel 22 on the window-facing side of the bottom rail 18 provides power for the rechargeable battery 24 in the bottom rail, which is also used to power the environmental sensors 20 and the control buttons.

Figure 9:
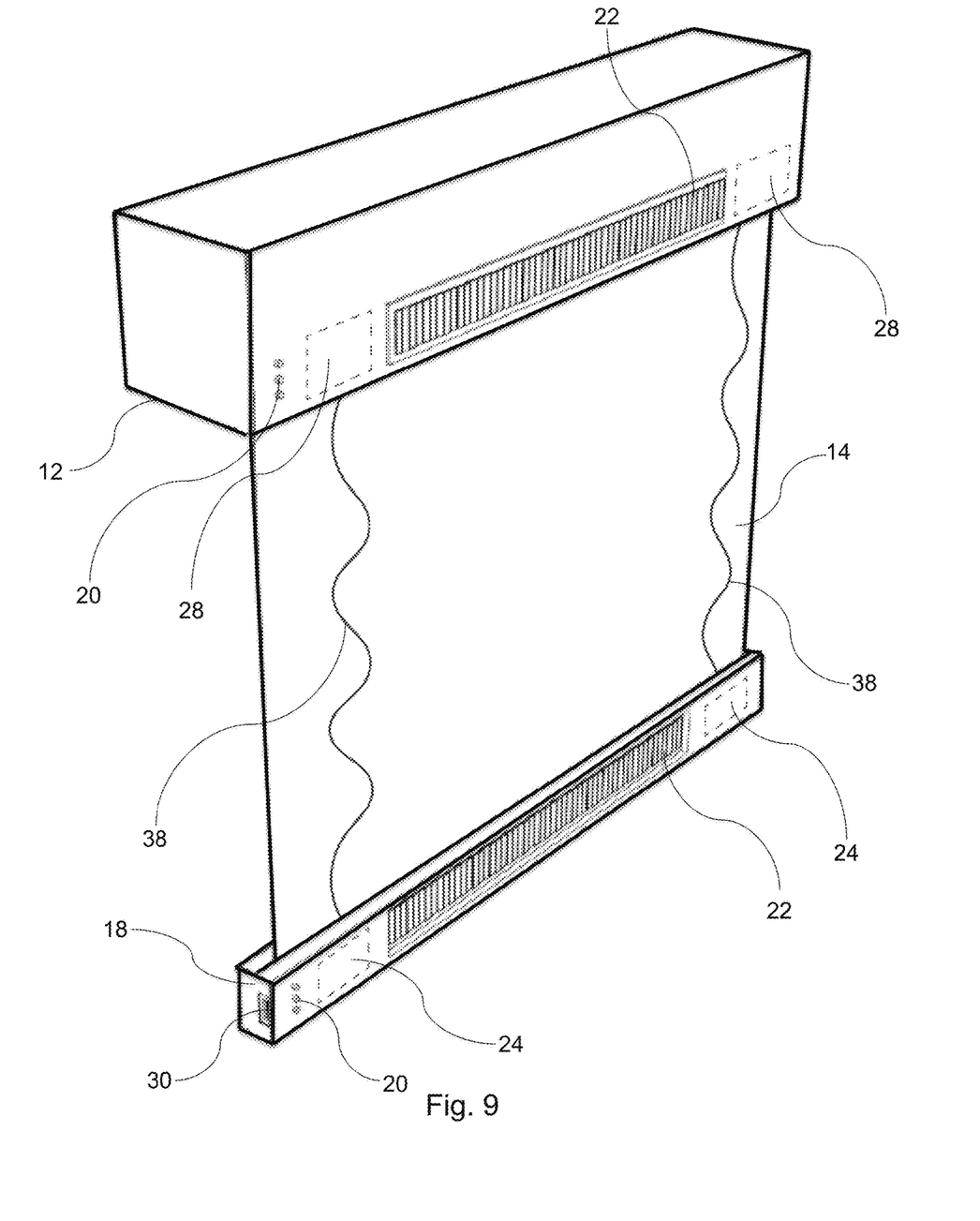
FIG. 9 is a perspective view of one embodiment of a self-contained, solar-powered, self-regulating, intelligent automated window treatment viewed from the window facing side of the window treatment with the shade fully lowered. The window treatment contains printed ink conductive lines printed on the shade fabric.

FIG. 9 shows another embodiment of a self-contained, solar-powered, self-regulating intelligent automated motorized window treatment with increased energy efficiency 10 invention, where power derived from the solar cell 22 or the USB charging port 30 of the bottom rail 18 is stored in the rechargeable battery 24 of the bottom rail 18 until it is transferred to the rechargeable battery 28 of the headrail 12 to power the motor 26, by way of printed ink conductive lines 38 printed onto the shade fabric 14.

Figure 10:
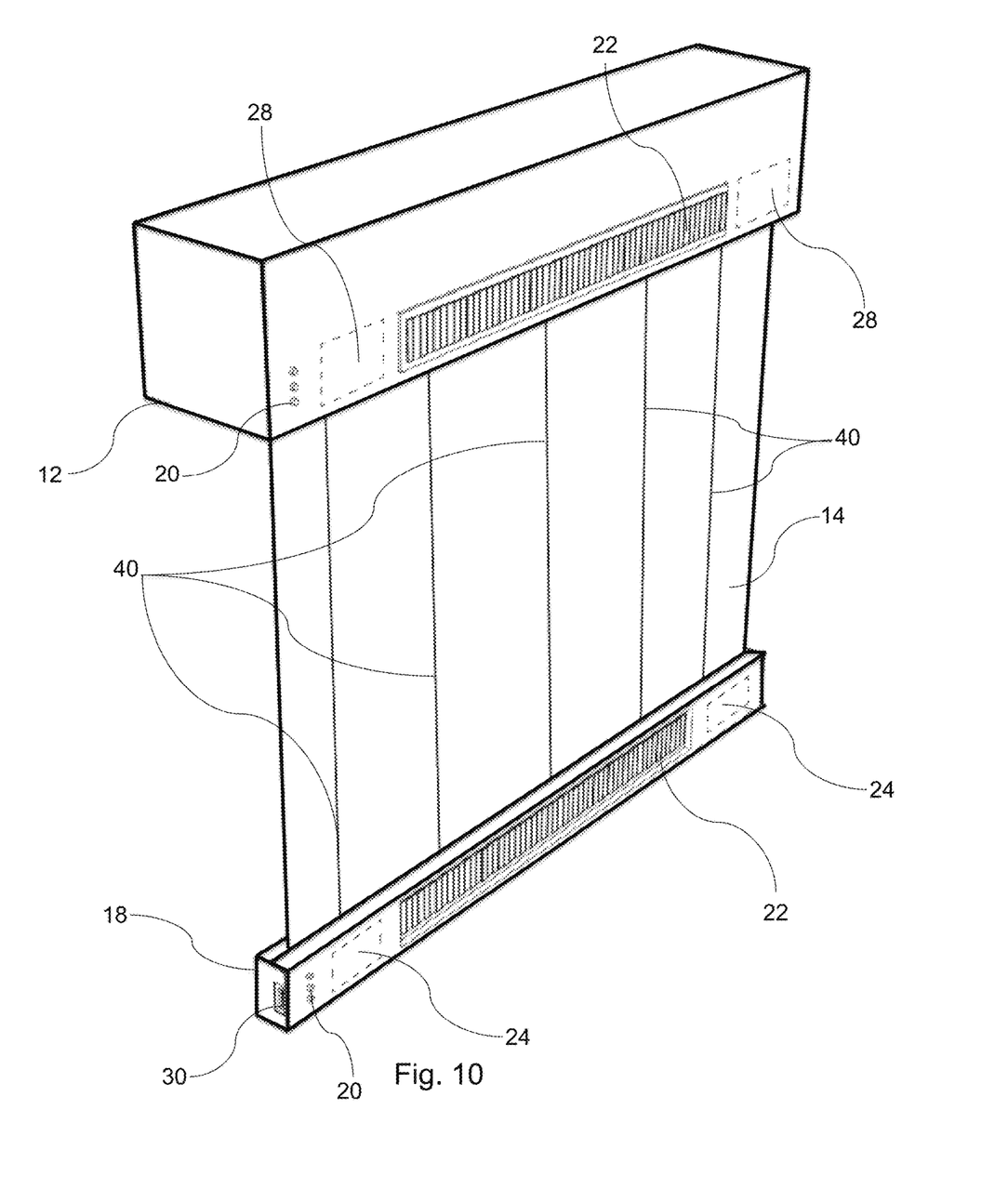
FIG. 10 is a perspective view of one embodiment of a self-contained, solar-powered, self-regulating, intelligent automated window treatment viewed from the window facing side of the window treatment with the shade fully lowered. The window treatment contains conductive thread woven into the fabric of the shade.

FIG. 10 shows another embodiment of a self-contained, solar-powered, self-regulating intelligent automated motorized window treatment with increased energy efficiency 10 invention, where power derived from the solar cell 22 or the USB charging port 30 of the bottom rail 18 is stored in the rechargeable battery 24 of the bottom rail 18 until it is transferred to the rechargeable battery 28 of the headrail 12 to power the motor 26, by way of conductive thread 40 woven into the shade fabric 14.

Figure 11:
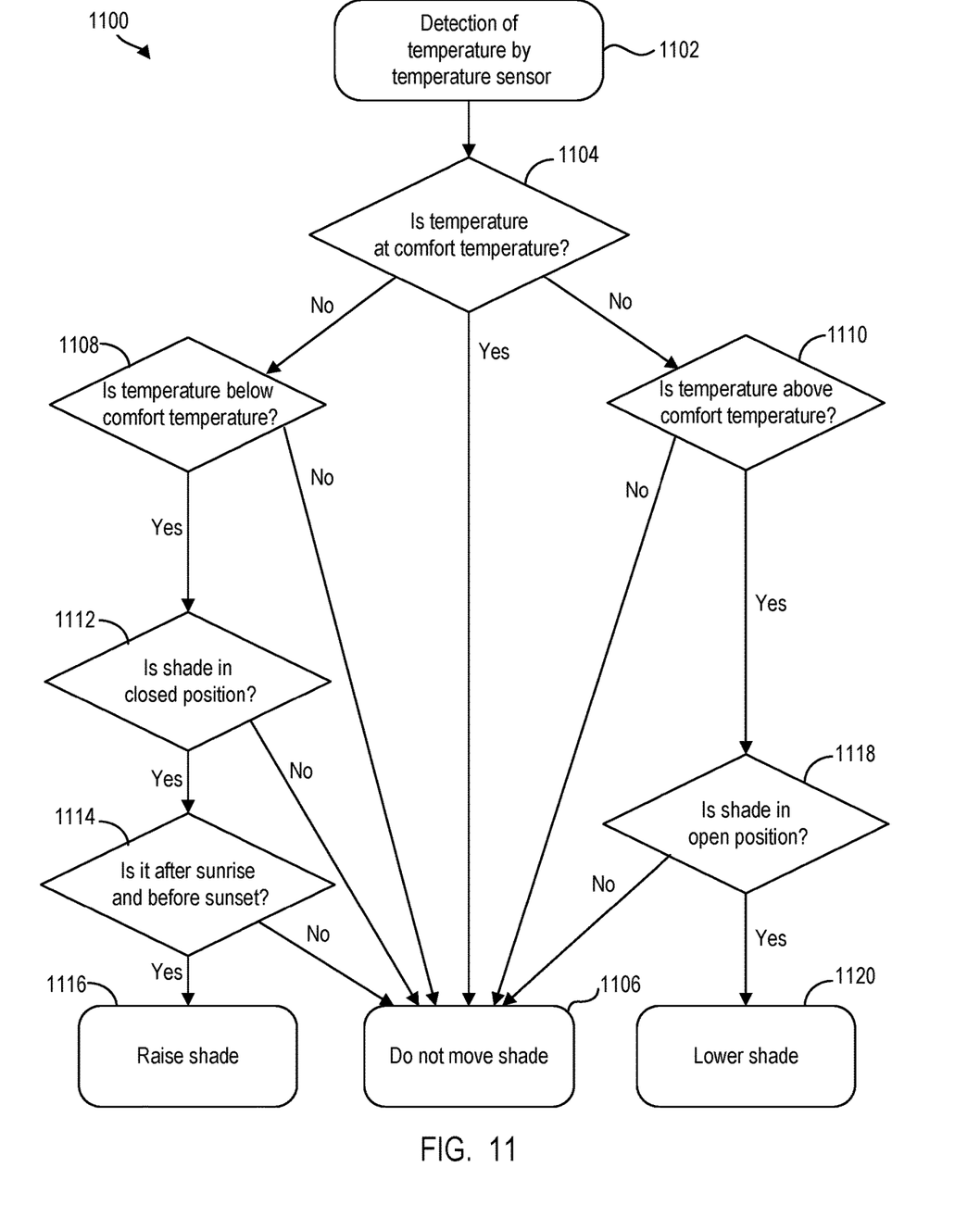
FIG. 11 is a simplified flowchart showing a visual representation of the sequence of steps and decisions to be performed by the self-contained, solar-powered, self-regulating, intelligent automated window treatment when determining when the shade should automatically raise and lower to allow for reduction of energy consumption using information from the temperature environmental sensor.

FIG. 11 is a simplified flowchart of the procedure that an embodiment of the self-contained, solar-powered, self-regulating intelligent automated motorized window treatment with increased energy efficiency 10 may follow after receiving input from a temperature environmental sensor 20.

Figure 12:
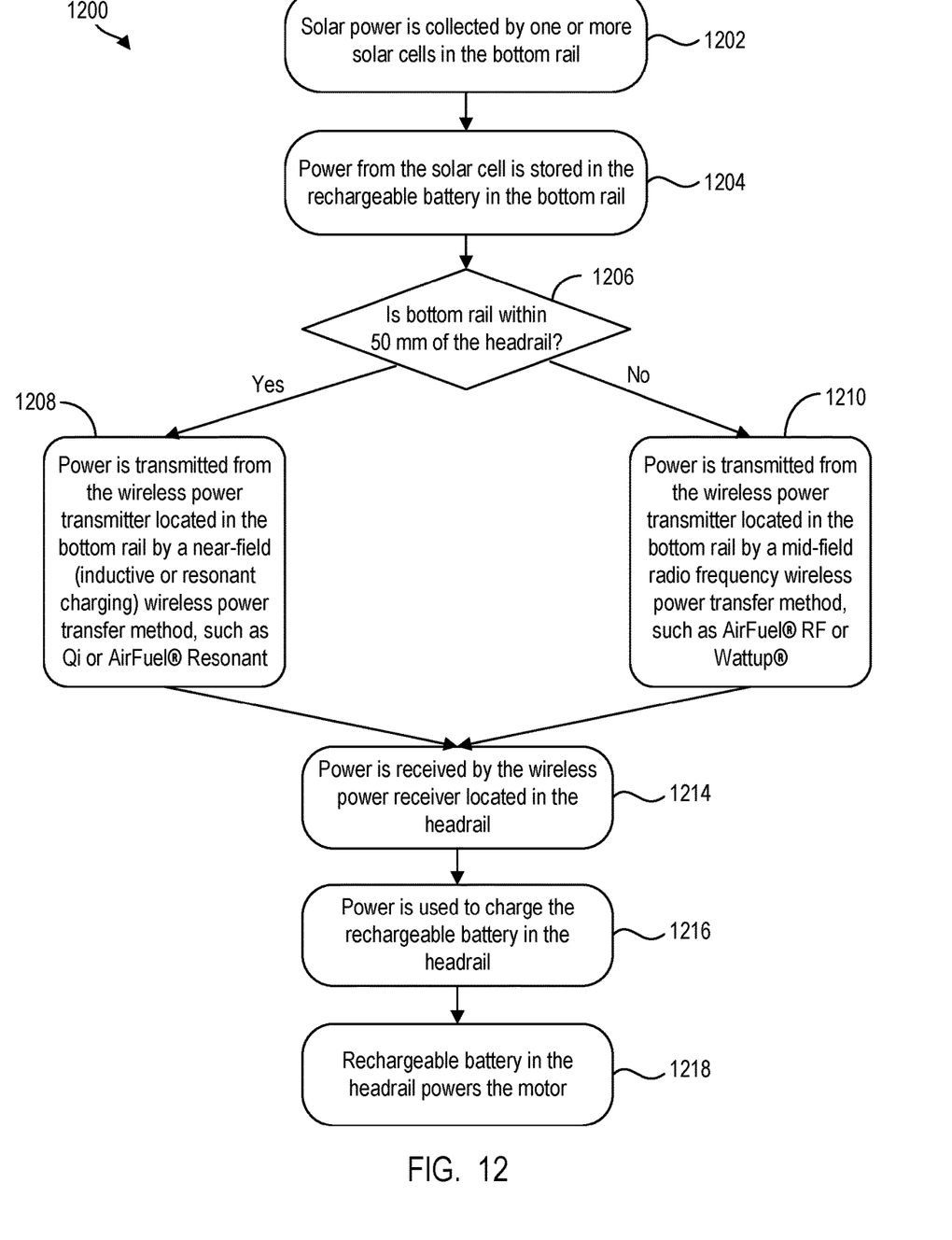
FIG. 12 is a simplified flowchart showing a visual representation of the sequence of steps and decisions to be performed by one embodiment of the self-contained, solar-powered, self-regulating, intelligent automated window treatment when wirelessly transferring solar power collected by the solar panel in the bottom rail to the motor in the headrail.

FIG. 12 is a simplified flowchart of the procedure that an embodiment of the self-contained, solar-powered, self-regulating intelligent automated motorized window treatment with increased energy efficiency 10 may follow when wirelessly transferring solar power collected by the solar panel 22 in the bottom rail 18 to the motor 26 in the headrail 12.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed:

1. A window treatment system comprising:
a headrail housing a headrail battery, a headrail motor powered by the headrail battery and a receiver electrically coupled to the headrail battery, the headrail battery being a rechargeable battery and the receiver being operable to receive wirelessly transmitted power;
a window shade fabric extending between a first terminus and a spaced apart second terminus, wherein the first terminus is affixed inside the headrail and is raised and lowered by the headrail motor; and
a bottom rail attached to the second terminus of the shade fabric, the bottom rail housing a bottom rail battery and a transmitter electrically coupled to the bottom rail battery, the bottom rail battery being a rechargeable battery and the transmitter being operable to:
upon determining that the bottom rail is within a predetermined distance of the headrail, wirelessly transmit stored power in the bottom rail battery to the receiver in the headrail, to recharge the headrail battery, using a first wireless power transmission technique, and
upon determining that the bottom rail is not within a predetermined distance of the headrail, wirelessly transmit stored power in the bottom rail battery to the receiver in the headrail using a second wireless power transmission technique, wherein the first wireless power transmission technique is different than the second wireless power transmission technique.

2. The window treatment system of claim 1, wherein the first wireless power transmission technique comprises one or more of inductive charging, nearfield wireless charging and resonant charging, or the second wireless power transmission technique comprises mid-field radio frequency (RF) transmission.

3. The window treatment system of claim 1, wherein the predetermined distance is approximately 50 millimeters.

4. The window treatment system of claim 1, wherein the bottom rail further houses at least one bottom rail solar panel, the at least one bottom rail solar panel being electrically coupled to the bottom rail battery to recharge the bottom rail battery using solar power, and wherein the transmitter is operable to transmit the solar power stored in the bottom rail battery.

5. The window treatment system of claim 1, wherein the headrail further houses at least one headrail solar panel, the at least one headrail solar panel being electrically coupled to the headrail battery for recharging the headrail battery using solar power.

6. The window treatment system of claim 1, wherein the headrail further houses a tube, and the first terminus of the shade fabric is affixed and wrapped around the tube, and the headrail motor raises and lowers the window shade fabric by rotating the tube.

7. The window treatment system of claim 1, wherein at least one of the bottom rail and the headrail further houses at least one environmental sensor, the at least one environmental sensor being electrically coupled to the respective headrail or bottom rail battery.

8. The window treatment system of claim 7, wherein the at least one environmental sensor comprises at least one of a light sensor, a temperature sensor, a UV light sensor, or a humidity sensor.

9. The window treatment system of claim 1, wherein at least one of the bottom rail and the headrail further comprises at least one charging port for charging the respective headrail or bottom rail battery.

10. The window treatment system of claim 9, wherein the charging port is a universal serial bus (USB) charging port.

11. The window treatment system of claim 1, wherein the window treatment is operated and monitored using an associated software application operating on at least one of a mobile or a desktop device.

12. The window treatment system of claim 11, wherein the headrail motor communicates directly with the software application using a wireless communication protocol.

13. The window treatment system of claim 11, wherein the wireless communication protocol is a BLUETOOTH® technology.

14. The window treatment system of claim 1, wherein at least one of the headrail or the bottom rail includes at least one control button, the at least one control button being electrically coupled to the respective headrail or bottom rail battery and being operable to control operation of the window treatment.

15. The window treatment system of claim 14, wherein the at least one control button comprises at least one of a button to raise the shade, a button to lower the shade, or a button for a user's favourite shade position.

16. The window treatment system of claim 15, wherein the bottom rail includes the at least one control button, and the at least one control button communicates with the headrail motor to control operation of the headrail motor.

17. The window treatment system of claim 16, wherein the at least one control button communicates with the headrail motor using a communication method comprising at least one of an RF wireless communication method, a BLUETOOTH® technology communication method, piezoelectric RF technology, printed ink conductive line on the shade fabric or conductive thread woven in the shade fabric.

18. A method for operating a window treatment system comprising a headrail, a bottom rail and a window shade fabric extending between a first terminus and a spaced apart second terminus, wherein the first terminus is affixed inside the headrail and the second terminus is attached to the bottom rail, the method comprising:
storing power in a bottom rail battery housed inside the bottom rail, the bottom rail battery being a rechargeable battery;
determining, by the system, if the bottom rail is within a predetermined distance of the headrail;
if the bottom rail is determined to be within the predetermined distance of the headrail, transmitting, via a transmitter housed inside the bottom rail and electrically coupled to the bottom rail battery, stored power inside the bottom rail battery to the headrail using a first wireless power transmission technique, otherwise if the bottom rail is determined not to be within the predetermined distance of the headrail, transmitting, via the transmitter, the stored power inside the bottom rail battery to the headrail using a second wireless power transmission technique, wherein the transmitter is operable to wirelessly transmit power, and wherein the first wireless power transmission technique is different than the second wireless power transmission technique;
receiving, via a receiver housed inside the headrail, the wirelessly transmitted power, wherein the receiver is operable to receive wirelessly transmitter power;
charging, using the wirelessly transmitted power, a headrail battery housed inside the headrail and electrically coupled to the receiver, the headrail battery being a rechargeable battery; and powering a headrail motor housed inside the headrail and electrically coupled to the headrail battery, the headrail motor being operable to raise and lower the window shade fabric.

19. The method of claim 18, wherein the first wireless power transmission technique comprises one or more of inductive charging, nearfield wireless charging or resonant charging, and the second wireless power transmission technique comprises mid-field radio frequency (RF) transmission.

20. The method of claim 18, wherein the predetermined distance is approximately 50 millimeters.

21. The method of claim 18, wherein the bottom rail further houses at least one bottom rail solar panel electrically coupled to the bottom rail battery, the at least one bottom rail solar panel being configured to recharge the bottom rail battery using solar power, and wherein transmitting the stored power inside the bottom rail battery comprises transmitting the solar power stored in the bottom rail battery.

22. The method of claim 18, wherein the headrail further houses at least one headrail solar panel, the at least one headrail solar panel being electrically coupled to the headrail battery, and the method further comprises: recharging the headrail battery using solar power from the at least one headrail solar panel.

23. The method of claim 18, wherein the headrail further houses a tube, and the first terminus of the shade fabric is affixed and wrapped around the tube, and the method further comprises: activating the headrail motor to rotate the tube to raise and lower the window shade fabric.

24. The method of claim 18, wherein at least one of the bottom rail and the headrail further houses at least one environmental sensor electrically coupled to the respective headrail or bottom rail battery and the method further comprising: monitoring surrounding environmental parameters using the at least one environmental sensor.

25. The method of claim 24, wherein the at least one environmental sensor comprises at least one of a light sensor, a temperature sensor, a UV light sensor, or a humidity sensor.

26. The method of claim 18, wherein at least one of the bottom rail and the headrail further comprises at least one charging port, and the method further comprises: charging the respective headrail or bottom rail battery using the at least one charging port.

27. The method of claim 26, wherein the at least one charging port is a universal serial bus (USB) charging port.

28. The method of claim 18, further comprising operating and monitoring the window treatment using an associated software application operating on at least one of a mobile or desktop device.

29. The method of claim 28, further comprising using a wireless communication protocol to directly communicate between the headrail motor and the software application.

30. The method of claim 29, wherein the wireless communication protocol comprises a BLUETOOTH® technology.

31. The method of claim 18, wherein at least one of the headrail or bottom rail includes at least one control button, the at least one control button being electrically coupled to the respective headrail or bottom rail battery, and the method further comprises: operating the at least one control button to control operation of the window treatment.

32. The method of claim 31, wherein the at least one control button comprises at least one of a button to raise the shade, a button to lower the shade, and a button for a user's favourite shade position.

33. The method of claim 31, wherein the bottom rail includes the at least one control button, and the method further comprises: in response to operating the at least one control button, transmitting a communication from the at least one control button to the headrail motor to control the operation of the headrail motor.

34. The method of claim 33, wherein the at least one control button communicates with the headrail motor using a communication method comprising at least one of a RF wireless communication method, a BLUETOOTH® technology communication method, piezoelectric RF technology, printed ink conductive line on the shade fabric, or conductive thread woven in the shade fabric.

* * * * *

UNITED STATES PATENT AND TRADEMARK OFFICE
CERTIFICATE OF CORRECTION

PATENT NO. : 11,203,899 B2
APPLICATION NO. : 15/918066
DATED : December 21, 2021
INVENTOR(S) : Pereira It is certified that error appears in the above-identified patent and that said Letters Patent is hereby corrected as shown below:

In the Claims

In Claim 2, Column 7, Line 32, "more of inductive charging, nearfield wireless charging and..." should read -- more of inductive charging, nearfield wireless charging or --.

In Claim 2, Column 7, Line 33, "resonant charging, or the second wireless power ..." should read -- resonant charging, and the second wireless power --.

Signed and Sealed this
Tenth Day of May, 2022

Katherine Kelly Vidal
*Director of the United States Patent and Trademark Office*